(12) United States Patent
Tomikawa et al.

(10) Patent No.: US 8,406,092 B2
(45) Date of Patent: Mar. 26, 2013

(54) THERMALLY-ASSISTED MAGNETIC RECORDING HEAD

(75) Inventors: Satoshi Tomikawa, Tokyo (JP); Shinji Hara, Tokyo (JP)

(73) Assignee: TDK Corporation, Tokyo (JP)

( * ) Notice: Subject to any disclaimer, the term of this patent is extended or adjusted under 35 U.S.C. 154(b) by 214 days.

(21) Appl. No.: 12/892,391

(22) Filed: Sep. 28, 2010

(65) Prior Publication Data

US 2012/0075966 A1    Mar. 29, 2012

(51) Int. Cl.
*G11B 11/00*    (2006.01)
(52) U.S. Cl. .............. 369/13.33; 369/13.13; 369/112.27
(58) Field of Classification Search .............. 369/13.33, 369/13.32, 13.24, 13.14, 13.03, 13.02, 13.12, 369/112.27, 112.09, 112.14, 112.01, 13.13, 369/13.17; 360/59, 125.31, 125.74
See application file for complete search history.

(56) References Cited

U.S. PATENT DOCUMENTS

| 7,330,404 | B2 | 2/2008 | Peng et al. | |
|---|---|---|---|---|
| 7,346,978 | B2 | 3/2008 | Sato | |
| 7,710,677 | B2 * | 5/2010 | Tanaka et al. | 360/59 |
| 7,957,099 | B2 * | 6/2011 | Tanaka et al. | 360/125.74 |
| 8,077,556 | B2 * | 12/2011 | Komura et al. | 369/13.02 |
| 8,102,625 | B2 * | 1/2012 | Shiramatsu et al. | 360/125.74 |
| 8,149,654 | B2 * | 4/2012 | Komura et al. | 369/13.33 |
| 2007/0217069 | A1 | 9/2007 | Okada et al. | |
| 2008/0112081 | A1 | 5/2008 | Matono | |
| 2008/0151431 | A1 | 6/2008 | Tanaka et al. | |
| 2008/0205202 | A1 | 8/2008 | Komura et al. | |
| 2009/0052077 | A1 | 2/2009 | Tanaka et al. | |

FOREIGN PATENT DOCUMENTS

JP    A-2009-070554    4/2009

* cited by examiner

*Primary Examiner* — Ali Neyzari
(74) *Attorney, Agent, or Firm* — Posz Law Group, PLC

(57) ABSTRACT

A thermally-assisted magnetic recording head that includes an air bearing surface facing a recording medium and that performs a magnetic recording while heating the recording medium includes a waveguide configured with a core through which light propagates and a cladding that surrounds a periphery of the core and that includes at least a portion extending to the air bearing surface; and a heat radiation layer that is embedded in the cladding that surrounds the periphery of the core on the air bearing surface, and that is made of a material having a higher thermal conductivity coefficient than the cladding.

7 Claims, 13 Drawing Sheets

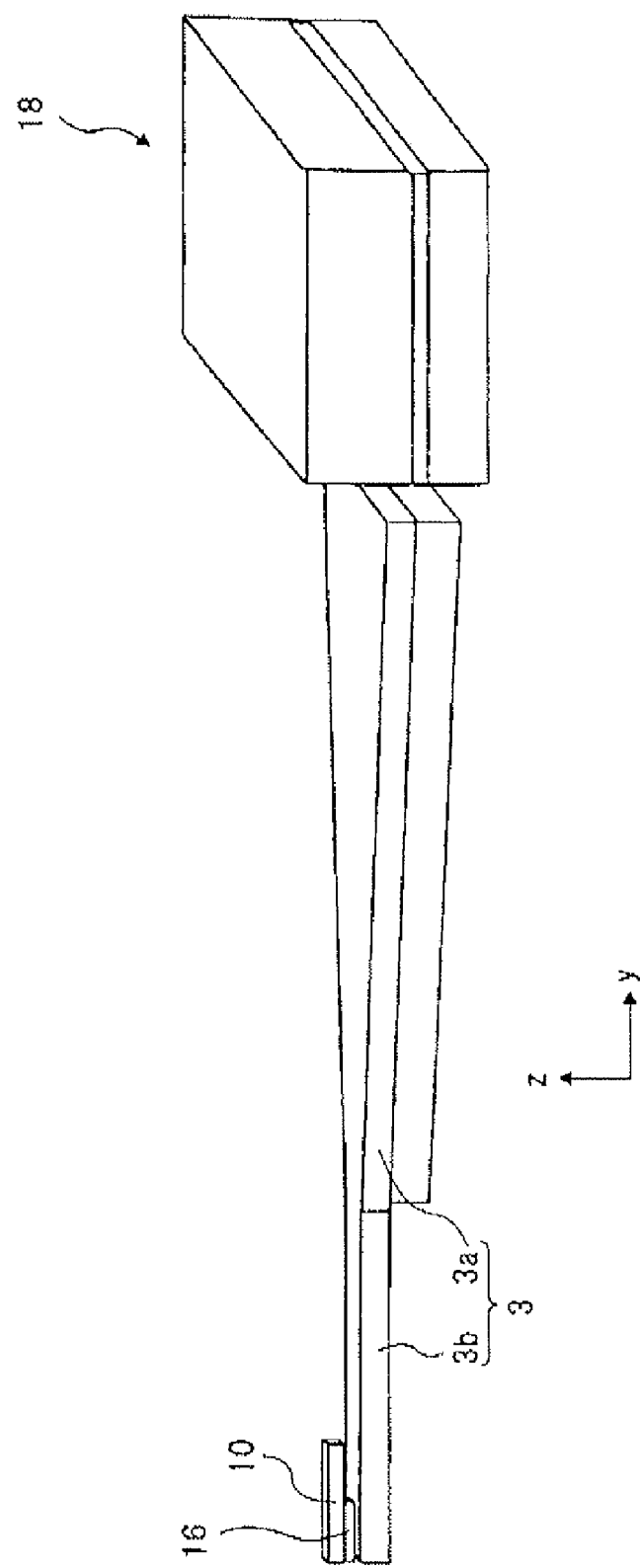

THERMALLY-ASSISTED MAGNETIC RECORDING HEAD

BACKGROUND OF THE INVENTION

1. Field of the Invention

The present invention relates to a thermally-assisted magnetic recording head that records information when the coercive force of a magnetic recording medium is decreased by irradiating near-field light onto the magnetic recording medium.

2. Description of the Related Art

In recent years, for magnetic recording devices such as magnetic disk devices, performance improvements of a thin film magnetic head and a magnetic recording medium are demanded in association with the high recording density. For the thin film magnetic head, a composite-type thin film magnetic head has widely been used, in which a reproducing head having a magneto resistive effect element (MR element) for reading and a magnetic recording head having an inductive-type electromagnetic transducer (a magnetic recording element) for writing are laminated on a substrate. In magnetic disk devices, the thin film magnetic head is disposed on a slider that flies just above a surface of the magnetic recording medium.

The magnetic recording medium is a discontinuous medium on which magnetic microparticles gather. Each of the magnetic microparticles has a single magnetic domain structure. Of the magnetic recording medium, one recording bit is configured with a plurality of magnetic microparticles. In order to increase the recording density, the asperity of a boundary of adjacent recording bits needs to be small. For this, the size of the magnetic microparticles needs to be decreased. However, when the size of the magnetic microparticles is decreased, thermal stability of the magnetization of the magnetic microparticles is also decreased corresponding to the decreased volume of the magnetic microparticles. In order to solve this problem, increasing the anisotropy energy of the magnetic microparticles is effective. However, when the anisotropy energy of the magnetic microparticles is increased, the coercive force of the magnetic recording medium is also increased. As a result, it becomes difficult to record information using a conventional magnetic recording head. The conventional magnetic recording head has such a drawback, and this is a large obstacle to achieving an increase in the recording density.

As a method to solve this problem, a so-called thermally-assisted magnetic recording method is proposed. In this method, a magnetic recording medium having a large coercive force is utilized. The magnetic field and heat are simultaneously added to a portion of the magnetic recording medium where information is recorded at the time of recording the information. Using this method, the information is recorded under a state where the temperature of the information record part is increased and the coercive force is decreased.

For a thermally-assisted magnetic recording, a method in which a laser light source is used to heat the magnetic recording medium is common. Such a method has two types of methods: one method is to heat the magnetic recording medium by guiding laser light to a recording unit via a waveguide, etc. (a direct heating type); and the other method is to heat the magnetic recording medium by converting the laser light to near-field light (a near-field light heating type). The near-field light is a type of electromagnetic field that is formed around a substance. Ordinary light cannot be tapered to a smaller region than its wavelength due to diffraction limitations. However, when light having an identical wavelength is irradiated onto a microstructure, near-field light that depends on the scale of the microstructure is generated, enabling the light to be tapered to a minimal region being only tens of nm in size.

In U.S. Patent Application Publication No. 2008/205202, another configuration is disclosed in which a near-field generator is disposed in a front part of a core of a waveguide through which light from a light emission element (a laser diode) propagates.

In U.S. Patent Application Publication No. 2008/151431, a configuration is disclosed in which a near-field generator plate and a near-field scatter plate are disposed in a front part of a waveguide in which the light enters and propagates. The near-field generator plate has a sharp edge part on one edge. The near-field scatter plate is arranged along an edge part that is on the opposite side of the sharp edge part of the near-field generator plate.

In Japanese Laid-Open Patent Publication No. 2009-070554, a configuration is disclosed in which a low refractive index part made of $SiO_2$ is disposed between a near-field generator and a core of a waveguide in which light enters and propagates. A refractive index of the $SiO_2$ that configures the low refractive index part is smaller than that of $Ta_2O_5$ that configures the core.

As a concrete method for generating the near-field light, a method using a so-called plasmon antenna is common. The plasmon antenna is a metal referred to as a near-field light probe that generates near-field light from a light-excited plasmon.

Direct irradiation of light generates the near-field light in the plasmon antenna. With this method, a conversion efficiency of converting irradiated light into the near-field light is low. Most of the energy of the irradiated light on the plasmon antenna reflects off the surface of the plasmon antenna or is converted into thermal energy. The size of the plasmon antenna is set to the wavelength of the light or less, so that the volume of the plasmon antenna is small. Accordingly, the temperature increase in the plasmon antenna due to the above-described heat generation becomes significantly large.

Due to the temperature increase, the volume of the plasmon antenna expands, and the plasmon antenna protrudes from an air bearing surface, which is a surface facing the magnetic recording medium. Then, the distance between an edge part of the air bearing surface of the MR element and the magnetic recording medium increases, and it becomes difficult to read servo signals recorded on the magnetic recording medium during the recording process. Moreover, when the heat generation is large, the plasmon antenna may melt.

Currently, a technology is proposed that does not directly irradiate light onto the plasmon antenna. For example, U.S. Pat. No. 7,330,404 discloses such a technology. In this technology, light propagating through a waveguide, such as an optical fiber, etc., is not directly irradiated onto the plasmon antenna, but the light is coupled to a plasmon generator in a surface plasmon mode via a buffer portion to excite the surface plasmon in the plasmon generator. The plasmon generator includes a near-field generator that is positioned on the air bearing surface and that generates the near-field light. At the interface between the waveguide and the buffer portion, the light propagating through the waveguide is completely reflected, and other light, which is referred to as evanescent light and which penetrates into the buffer portion, is simultaneously generated. The evanescent light and a collective oscillation of charges in the plasmon generator are coupled, and the surface plasmon in the plasmon generator is then excited. The excited surface plasmon propagates to the near-field generator along the plasmon generator, and then generates near-field light in the near-field generator. According to this technology, since the plasmon generator is not directly irradiated by the light propagating through the waveguide, an excessive temperature increase of the plasmon generator is prevented.

In thermally-assisted magnetic recording where a recording is performed while heating a predefined position of the magnetic recording medium, light from a light emission element (for example, a laser diode) is gradually tapered in the core of the waveguide such that a spot size is decreased, and the light then propagates to the near-field generator. However, according to results examined and analyzed by the present applicant, approximately 10% of the light emitted by the light emission element does not enter the core of the waveguide. Also, approximately 30% of the light entering the core is discharged to the outside when tapered in the core. Approximately 65% of the light tapered and propagating in the core is not coupled to the near-field generator. Light energy that does not contribute to generate the near-field light is converted to heat, and causes a temperature increase of the thermally-assisted magnetic recording head. Particularly, the light, which propagates in the core but is not coupled to the near-field generator, is highly energized due to being tapered in the core. Therefore, the light generates a large amount of heat.

As described above, the thermally-assisted magnetic recording has a problem in that performance and reliability of the thermally-assisted magnetic recording head deteriorate over time. For example, a thermal deformation gradually occurs in each part of the thermally-assisted magnetic recording head due to the temperature increase not only in the magnetic recording medium but also in the thermally-assisted magnetic recording head itself, and a magnetization is changed due to, for example, corrosion of the shield layer.

In U.S. Pat. No. 7,346,978, a configuration in which a metal layer is disposed to release heat of the inside of the thin film magnetic head is disclosed. With this configuration, Joule heat generated by a recording current flowing in a coil layer and heat due to eddy current generated in a core can be released. However, this configuration is not related to the thermally-assisted magnetic recording, and heat generated at and around the air bearing surface is not considered at all. Therefore, the temperature increase in a thermally-assisted magnetic recording head due to the thermally-assisted magnetic recording is hardly suppressed.

SUMMARY OF THE INVENTION

An objective of the present invention is to provide a thermally-assisted magnetic recording head that prevents a decrease in performance and reliability due to a temperature increase in the thermally-assisted magnetic recording head itself when thermally-assisted magnetic recording is performed.

A thermally-assisted magnetic recording head of the present invention, which includes an air bearing surface facing a recording medium and that performs a magnetic recording while heating the recording medium, includes a waveguide configured with a core through which light propagates and a cladding that surrounds a periphery of the core and that includes at least a portion extending to the air bearing surface; a heat radiation layer that is embedded in the cladding that surrounds the periphery of the core on the air bearing surface, and that is made of a material having a higher thermal conductivity coefficient than the cladding.

With the present invention, an increase in temperature due to the thermally assisted magnetic recording at the air bearing surface and its vicinity is suppressed. Thereby, deterioration in performance and reliability of the thermally assisted magnetic recording head is suppressed.

The above and other objects, features and advantages of the present invention will become apparent from the following description with reference to the accompanying drawings which illustrate examples of the present invention.

BRIEF DESCRIPTION OF THE DRAWINGS

FIG. 4 is a perspective view illustrating a light source, a core, and the plasmon generator of the slider illustrated in FIG. 2;

DESCRIPTION OF THE PREFERRED EMBODIMENTS

Figure 1:
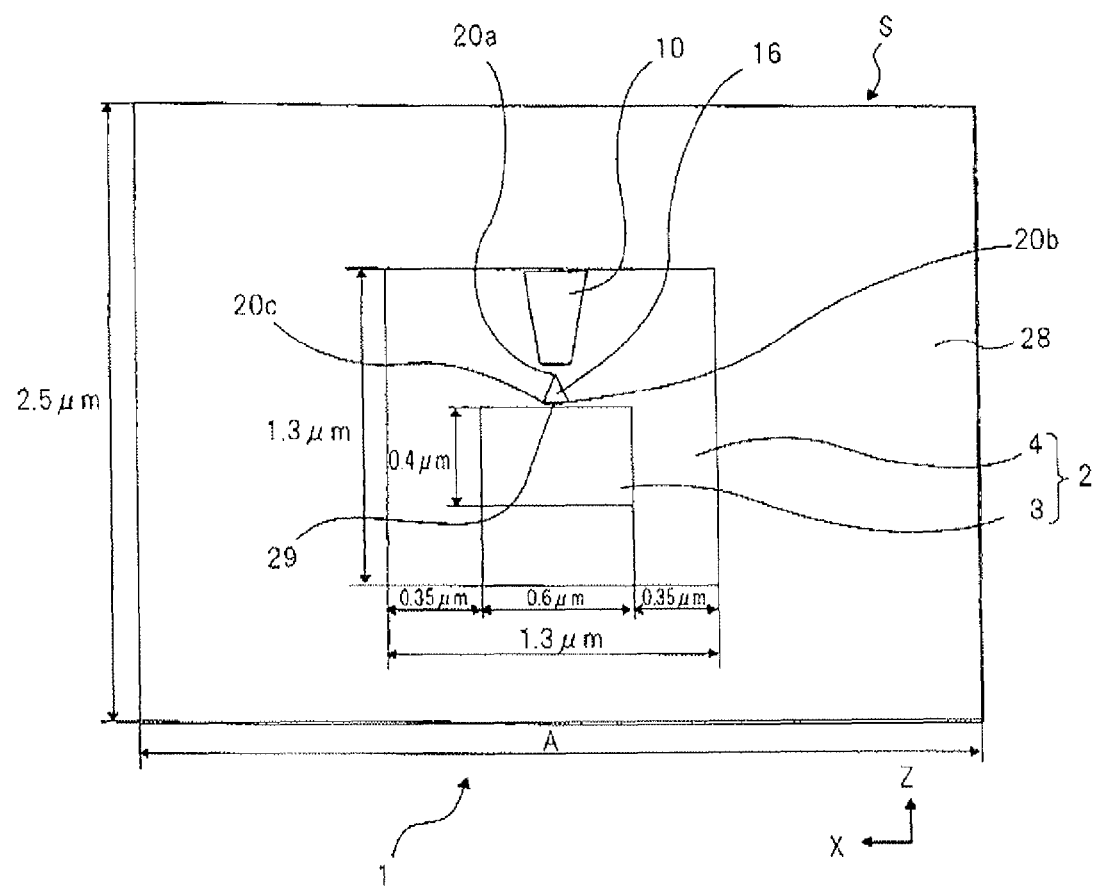
FIG. 1 is a front view of an air bearing surface illustrating a main part of a thermally-assisted magnetic recording head of the present invention.

A thermally-assisted magnetic recording head of the present invention will be explained referring to the drawings.

Initially, a basic configuration of a thermally-assisted magnetic recording head 1 of the present invention will be explained. The thermally-assisted magnetic recording head 1 performs a so-called thermally-assisted magnetic recording that records information by applying a magnetic field under a state where a coercive force of a magnetic recording medium 14 is partially decreased by heating the magnetic recording medium 14.

As illustrated in FIG. 1, the thermally-assisted magnetic recording head 1 includes a waveguide 2 into which laser light used to heat the magnetic recording medium 14 enters. The waveguide 2 is configured with a core 3 and a cladding 4 surrounding the periphery of the core 3. Furthermore, at an air bearing surface S facing the magnetic recording medium 14, a heat radiation layer 28 is embedded in the cladding 4 surrounding the core 3 of the waveguide 2. The heat radiation layer 28 is made of a metal, such as Au, Ag, Pt, Fe or Cu, or an alloy including at least one of Au, Ag, Pt, Fe and Cu, which are materials at least having a larger thermal conductivity coefficient than the cladding 4.

The thermally-assisted magnetic recording head 1 may have either a configuration where the magnetic recording medium 14 is heated by irradiating propagating light propagating in the core 3 of the waveguide 2 directly to the magnetic recording medium 14, or a configuration where propagating light propagating in the core 3 of the waveguide 2 is converted to near-field light and the magnetic recording medium 14 is heated by the near-field light. Regardless of each of the configurations, conventionally, the temperature of the thermally-assisted magnetic recording head 1 itself is increased when the magnetic recording medium 14 is heated, and thermal deformations in each part occurs over time. Therefore, performance and reliability of the thermally-assisted magnetic recording head 1 may deteriorate. However, in the present invention, since the heat radiation layer 28, made of a metal, etc., is embedded in the cladding 4 surrounding the core 3 of the waveguide 2 at the air bearing surface S, heat is radiated to the outside from the heat radiation layer 28. Therefore, the temperature increase in the thermally-assisted magnetic recording head 1 is suppressed, and deterioration in performance and reliability of the thermally-assisted magnetic recording head 1 is suppressed.

Figure 2:
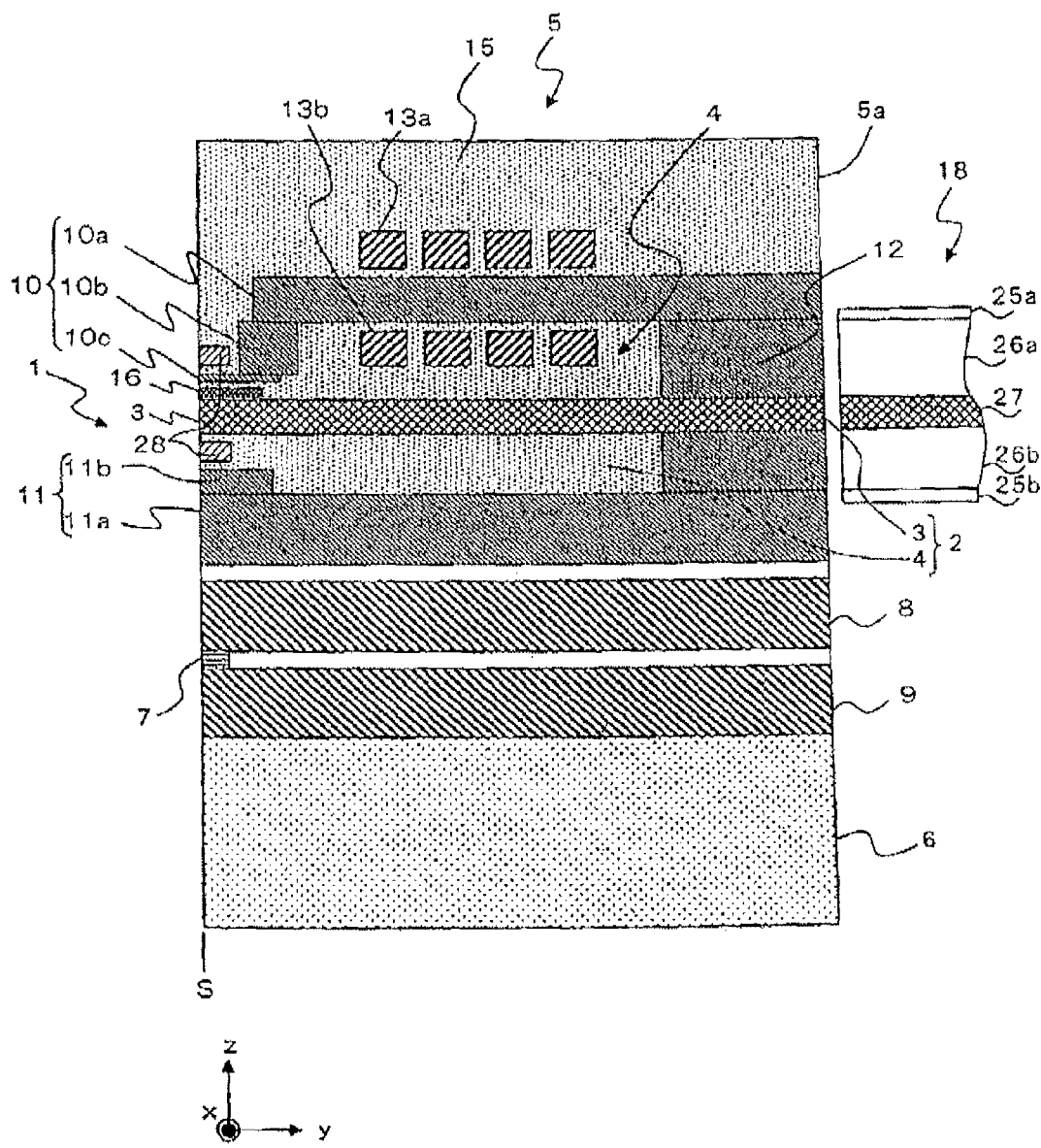
FIG. 2 is a cross sectional view of a main part of a slider including the thermally-assisted magnetic recording head illustrated in FIG. 1.
Figure 3:
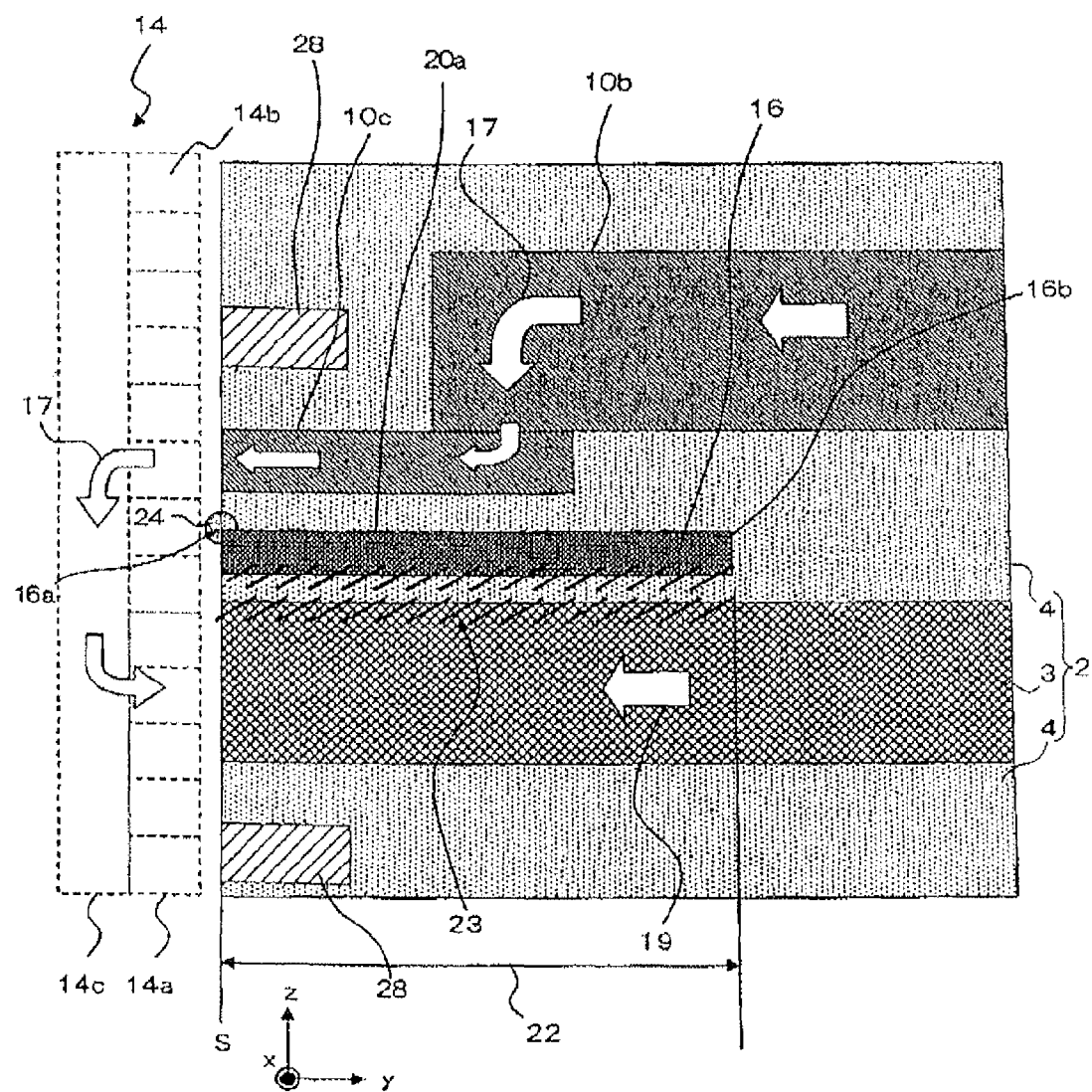
FIG. 3 is an enlarged view of the vicinity of a plasmon generator in the thermally-assisted magnetic recording head illustrated in FIG. 2.

Further detailed description of such a thermally-assisted magnetic recording head 1 of the present invention will be given. FIG. 2 is a main part cross sectional view of the slider 5 including the thermally-assisted magnetic recording head 1 of the present invention. FIG. 3 is an enlarged view of a part thereof. The slider 5 has a configuration where an MR element 7 that configures a reproducing head part and the thermally-assisted magnetic recording head 1 that is a recording head part are layered on a substrate 6 made of ALTIC ($Al_2O_3$.TiC). In the following description, a "lamination direction" indicates a film formation direction and a direction orthogonal to a film surface in a wafer process, and corresponds to the z-direction in each of the drawings. An "upward of lamination direction" is a direction toward an overcoat layer 15 from the substrate 6. A "downward of lamination direction" is a direction toward the substrate 6 from the overcoat layer 15.

The slider 5 includes the MR element 7, an upper shield layer 8, and a lower shield layer 9, the MR element 7 as the reproducing head part having a tip part exposed on the air bearing surface S, the upper shield layer 8 and the lower shield layer 9 disposed to sandwich the MR element 7 from the upper side and the lower side in the lamination direction. The MR element 7 can have any configuration using a magneto resistive effect, such as for example a current in plane (CIP)—giant magneto resistive (GMR) element in which a sense current flows in the direction parallel to the film surface, a current perpendicular to plane (CPP)—giant magneto resistive (GMR) element in which a sense current flows in the direction perpendicular to the film surface (a lamination direction), or a tunneling magneto resistive (TMR) element that uses a tunnel effect, or the like. When a CPP-GMR element or a TMR element is applied to the MR element 7, the upper shield layer 8 and the lower shield layer 9 are also utilized as electrodes to supply the sense current.

The slider 5 is provided with the thermally-assisted magnetic recording head 1 for a so-called perpendicular magnetic recording as the recording head part. The thermally-assisted magnetic recording head 1 has a pole 10 for recording. The pole 10 has a first body part 10a, a second body part 10b, and a pole tip part 10c, which are formed of, for example, an alloy made of any two or three of Ni, Fe, and Co. A return shield layer 11 is disposed in the downward of lamination direction of the pole 10. The return shield layer 11 has a first body part 11a and a second body part 11b, which are also formed of an alloy made, for example, of any two or three of Ni, Fe and Co. The pole 10 and the return shield layer 11 are magnetically linked to each other via a contact part 12. In the present embodiment, the return shield layer 11 is disposed in the downward of lamination direction of the pole 10; however, it can be also disposed in the upward of lamination direction of the pole 10. The overcoat layer 15, made of $Al_2O_3$, is disposed in the upward of lamination direction of the pole 10.

Coils 13a and 13b are wound around the pole 10 being centered around the contact part 12. Magnetic flux is generated at the pole 10 by a current applied to the coils 13a and 13b from the outside. The coils 13a and 13b are formed of a conductive material such as Cu, etc. The coils 13a and 13b in the present embodiment are disposed in a two-layer manner, but one layer or three or more layers are also practical. Furthermore, the number of windings is four in the present embodiment, but is not limited to four.

The pole 10 is tapered at the pole tip part 10c in the vicinity of the air bearing surface S not only in the direction orthogonal to the film surface (the z-direction) but also in a cross track direction (the x-direction). Referring to FIG. 3, magnetic flux 17 generated in the pole 10 is tapered as it travels toward the air bearing surface S, and the minute and strong magnetic flux 17 for writing, which is suitable for the high recording density, is discharged toward the magnetic recording medium 14 from the pole tip part 10c positioned on the air bearing surface S. The magnetic recording medium 14 has a configuration for perpendicular magnetic recording. A surface layer of the magnetic recording medium 14 is a recording layer 14a. The magnetic flux 17 discharged from the pole tip part 10c travels in the recording layer 14a in the perpendicular direction (the y-direction), and magnetizes each recording bit 14b of the recording layer 14a in the perpendicular direction. After the magnetic flux 17 passes through the recording layer 14a, the magnetic path of the magnetic flux 17 turns in an in-plane direction of the magnetic recording medium 14 (the z-direction) in an under layer 14c underneath made from a soft magnetic body. Furthermore, the direction of the magnetic flux 17 changes to the perpendicular direction (the y-direction) again in the vicinity of the return shield layer 11, and the magnetic flux 17 is absorbed by the return shield layer 11. In other words, the return shield layer 11 functions to control the magnetic flux 17 such that the magnetic flux 17 passes perpendicularly through the recording layer 14a and creates the U-shaped magnetic path.

Furthermore, the second body part 11b of the return shield layer 11 forms a trailing shield part whose layer cross section is wider in the cross track direction (the x-direction) than the first body part 11a. The placement of such a return shield layer 11 causes a steeper gradient of the magnetic field between the return shield layer 11 and the pole 10 in the vicinity of the air bearing surface S. As a result, signal output jitter is reduced and an error rate at the time of reading is decreased.

Referring to FIG. 2, the waveguide 2 and a plasmon generator 16 are disposed between the pole 10 and the return shield layer 11. The waveguide 2 is configured with the core 3 and the cladding 4 surrounding the core 3. The core 3 has a higher refractive index than the cladding 4. A laser light 19 (see FIG. 3) entering from a light source 18, which is described later, is tapered by a spot size converter 3a (see FIG. 4), which is a tapered shape part of the core 3, while reflecting completely off the interface between the core 3 and the cladding 4, and propagates toward the air bearing surface S. The cladding 4 is formed of, for example, $AlO_x$. The core 3 is formed of, for example, $TaO_x$. Herein, $AlO_x$ indicates aluminum oxide of arbitrary composition, and $Al_2O_3$ is typical. However, $AlO_x$ is not limited to $Al_2O_3$. Similarly, $TaO_x$ indicates tantalum oxide of arbitrary composition, and $Ta_2O_5$, $TaO$, $TaO_2$, etc. are typical. However, $TaO_x$ is not limited to $Ta_2O_5$, $TaO$, and $TaO_2$. In 6order to connect to the light source 18, the core 3 extends from the air bearing surface S to a back surface 5a of the slider 5. In addition, although not illustrated in the drawings, the cladding 4 exists between the core 3 and the contact part 12 as well. In the present invention, the heat radiation layer 28 made of a metal, etc. is embedded in the cladding 4 surrounding the core 3 of the waveguide 2 at the air bearing surface S.

The plasmon generator 16 is positioned away from the substrate 6, and extends to the air bearing surface S, facing a portion of the core 3. The plasmon generator 16 is formed of Au, Ag, Cu, Al, Pd, Ru, Pt, Rh, Ir or an alloy primarily consisting of these metals.

Herein, a description of the plasmon generator 16 will be given. A portion of the plasmon generator 16 that faces the pole 10 is a propagation edge 20a. A portion where the propagation edge 20a overlaps the core 3 is an overlapping part 22. A near-field generator 16a is formed at an edge part on the air bearing surface S side of the propagation edge 20a. The plasmon generator 16, at the overlapping part 22, couples with propagating light 19 propagating in the core 3 in a surface plasmon mode, and generates a surface plasmon 23. The surface plasmon 23 generated at the overlapping part 22 propagates toward the air bearing surface S along the propagation edge 20a and reaches the near-field generator 16a. Then, the propagated surface plasmon 23 generates near-field light 24 at the near-field generator 16a.

The above-described plasmon generator 16 is made of metal and has a substantially triangular prism shape having a triangular cross section as illustrated in FIG. 1. Three apexes of the plasmon generator 16 on the triangular cross section respectively form three edges 20a, 20b and 20c extending in the longitudinal direction (the y-direction) of the plasmon generator 16. Thus, the plasmon generator 16 is formed such that one side 29 of the triangular cross section faces the core 3, and one apex positioned at an opposite side from the side 29 configures the above-described propagation edge 20a. A plasmon coupling occurs at the propagation edge 20a facing the pole 10, and the near-field generator 16a is formed at the edge part on the air bearing surface S side of the propagation edge 20a. In an illustrated example, the cladding 4 exists between the plasmon generator 16 and the core 3; however, the plasmon generator 16 and the core 3 may be in direct contact.

FIG. 4 illustrates only portions relating to the propagation of light. As illustrated in FIG. 4, the plasmon generator 16 extends in a direction approximately parallel to the core 3 and also perpendicular to the air bearing surface S (the y-direction). As illustrated in FIGS. 2 and 3, the plasmon generator 16 does not extend to the back surface 5a of the slider 5. The propagation edge 20a includes an overlapping part 22 that overlaps the core 3 in the longitudinal direction of the plasmon generator 16 (the y-direction). The overlapping part 22 couples with the propagating light 19 that propagates through the core 3 in a surface plasmon mode, and generates the surface plasmon 23. A near-field generator 16a is formed at the edge part on the air bearing surface S side of the plasmon generator 16. The near-field generator 16a is positioned in the vicinity of a pole tip part 10c on the air bearing surface S. The propagation edge 20a enables the surface plasmon 23 generated in the overlapping part 22 to propagate along the propagation edge 20a to the near-field generator 16a. The near-field light 24 is generated from the near-field generator 16a. As described above, at the time of recording information, a magnetic field from the pole 10 and heat by the near-field light 24 are simultaneously applied to a portion of the magnetic recording medium 14 where information is recorded. With this method, temperature of the part where the information is recorded is increased, and the information is recorded under a decreased coercive force condition.

As illustrated in FIGS. 2 and 4, the light source 18 is connected to the back surface 5a of the slider 5. The light source 18 is a laser diode. The light source 18 has a pair of electrodes 25a and 25b, a positive (P) type cladding 26a and a negative (N) type cladding 26b that are sandwiched by the electrodes 25a and 25b, and an active layer 27 positioned between both of the claddings 26a and 26b, and these cleavage surfaces are in a reflecting mirror structure. The light source 18 is firmly attached to the slider 5 by an appropriate method. The active layer 27 that continuously oscillates the laser light 19 is aligned on the same line as the core 3 of the thermally-assisted magnetic recording head 1 such that the laser light 19 generated in the active layer 27 enters the core 3. The wavelength of the laser light 19 is not particularly limited, but laser light having a wavelength of approximately 800 nm is preferably used.

As illustrated in FIG. 4, the core 3 of the waveguide 2 is configured with the spot-size convertor 3a and a straight part 3b. The spot-size convertor 3a is gradually tapered from the back surface 5a side of the slider 5, in other words, from a side of the light source 18. The straight part 3b is positioned on the air bearing surface S side. As one example, a diameter of the propagating light 19 propagating through the core 3 is tapered when the propagating light 19 passes through the spot size converter 3a having a length of approximately 100 μm or less, and the propagating light 19 enters the straight part 3b having a rectangular cross section of a width 0.6 μm×a height 0.4 μm.

As a result of such an above-described configuration, when a magnetic recording is performed to the magnetic recording medium 14 using the slider 5, power is supplied to a pair of the electrodes 25a and 25b of the light source 18 which is linked to the back surface 5a of the slider 5, and then the active layer 27 generates the laser light 19 and enters the laser light 19 into the core 3 facing the active layer 27. The entered laser light 19 propagates toward the air bearing surface S in the core 3 as the diameter tapers in the spot size converter 3a. The plasmon generator 16, in the overlapping part 22 overlaps with the core 3, couples with the propagating light 19 propagating through the core 3 in the surface plasmon mode, and generates the surface plasmon 23. The surface plasmon 23 propagates along the propagation edge 20a of the plasmon generator 16 and reaches the near-field generator 16a. The near-field light 24 is generated based on the surface plasmon 23 at the near-field generator 16a. A portion of the recording layer 14a of the magnetic recording medium 14 is heated by this near-field light 24, and the coercive force is decreased. Then, simultaneously with this heating, current is applied to the coils 13a and 13b, magnetic flux is generated in the pole 10, and thereby the information is written. Since the near-field generator 16a for performing the heating and the pole 10 for performing the writing are closely positioned, the information is efficiently written to a portion of the recording layer 14a of the magnetic recording medium 14 where the coercive force is decreased due to the heating.

Regarding the laser light 19, at the time of the heating, energy of light that did not enter into the core 3, energy of light that was released to the outside when being tapered in the spot size converter 3a of the core 3, and energy of light that was not coupled with the near-field generator 16a are converted to heat. However, this heat is released from the heat radiation layer 28, which is embedded in the cladding 4 surrounding the core 3 of the waveguide 2 to the outside on the air bearing surface S. Therefore, a temperature increase of the thermally-assisted magnetic recording head 1 is suppressed. As a result, the thermal deformation over time of the thermally-assisted magnetic recording head 1 is suppressed, and deterioration in the performance and reliability is reduced.

Furthermore, the thermally-assisted magnetic recording head 1 of the present invention has an advantage that a positional arrangement with respect to the light source 18 during assembly is simplified. This is based on a characteristic below: the light is seen skewed at a position overlapping the heat radiation layer 28 because the metal configuring the heat radiation layer 28 absorbs the light and the light is attenuated. In other words, when a positional arrangement of the light source 18 and the waveguide 2 of the thermally-assisted magnetic recording head 1 is performed by a visual check from the air bearing surface S side while the light is irradiated from the light source 18, and when the light is seen skewed, it is recognized that the light from the light source 18 overlaps the heat radiation layer 28. As a result, a relative position between the light source 18 and the thermally-assisted magnetic recording head 1 should be changed. If the heat radiation layer 28 did not exist, it would be difficult to visually check whether or not the relative position between the light source 18 and the thermally-assisted magnetic recording head 1 is proper. However, since the heat radiation layer 28 is disposed in the present invention, a location, where the light skews while the relative position between the light source 18 and the thermally-assisted magnetic recording head 1 is changed, or, in other words, where the light overlaps the heat radiation layer 28, is easily recognized by a trial and error method. Accordingly, in view of the shape and size of the heat radiation layer 28, the positional arrangement is performed using the location where the light skews (where the light overlaps the heat radiation layer 28) as an indicator. Compared to other methods not using such an indicator, an extremely easy and proper positional arrangement is realized.

Furthermore, of the light from the light source 18, at least a part of the light passing through not the core 3 but the cladding 4 is absorbed by the metal configuring the heat radiation layer 28 and is attenuated. Therefore, it is possible to perform the positional arrangement only based on the visual check of the light passing through the core 3 with little interference by the light passing through the cladding 4. The positional arrangement is thereby more easily performed.

The positional arrangement using the visual check was explained above. On the other hand, even when the positional arrangement is automated, the setting process is simplified by using the metal configuring the heat radiation layer 28 as an indicator for properly defining a scanning area of a scan device used for the automatic positioning.

Next, one example of a method of manufacturing a head gimbal assembly that comprises the slider 5 including the thermally-assisted magnetic recording head 1 of the present invention will be explained. Additionally, detailed explanation of each process to which known methods can be applied will be omitted.

At first, as illustrated in FIG. 2, above the substrate 6 made of $Al_2O_3$.TiC, the lower shield layer 9, the MR element 7 that is a reproducing element, the upper shield layer 8, and the return shield layer 11 are layered in this order. Additionally, in the middle of this process, insulation layers are arbitrarily disposed between the lower shield layer 9 and the upper shield layer 8 and between the upper shield layer 8 and the return shield layer 11. In FIGS. 5A-20B, configurations of the return shield layer 11 and thereunder are omitted.

Figure 5A:
FIG. 5A is a cross sectional view, seen from the air bearing surface side.
Figure 5B:
FIG. 5B is a cross sectional view, cut along a direction orthogonal to the air bearing surface, illustrating one process of the manufacturing method of the thermally-assisted magnetic recording head.
Figure 6A:
FIG. 6A is a cross sectional view, seen from the air bearing surface side, illustrating a process subsequent to FIG. 5A.
Figure 6B:
FIG. 6B is a cross sectional view, cut along a direction orthogonal to the air bearing surface, illustrating a process subsequent to FIG. 5B.

As illustrated in FIGS. 5A and 5B, a part of the cladding 4 made of $AlO_x$ is formed above the return shield layer 11, the heat radiation layer 28 made of a metal or an alloy of, for example, Au, Ag, Pt, Fe, Cu, or/and the like is formed thereon, and then a patterning is performed as illustrated in FIGS. 6A and 6B. Additionally, "patterning" in this specification indicates an operation where a mask (not illustrated) is disposed on a layer, the layer is partially removed by performing milling, reactive ion etching (RIE), etc., and then the mask is removed.

Figure 7A:
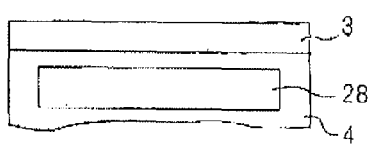
FIG. 7A is a cross sectional view, seen from the air bearing surface side, illustrating a process subsequent to FIG. 6A.
Figure 7B:
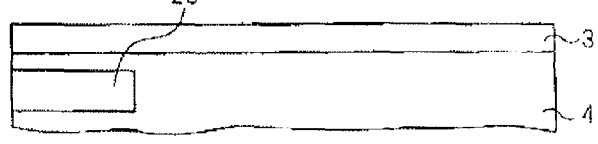
FIG. 7B is a cross sectional view, cut along a direction orthogonal to the air bearing surface, illustrating a process subsequent to FIG. 6B.
Figure 8A:
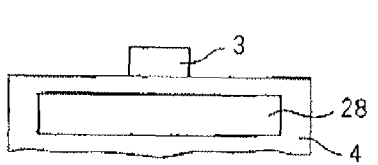
FIG. 8A is a cross sectional view, seen from the air bearing surface side, illustrating a process subsequent to FIG. 7A.
Figure 8B:
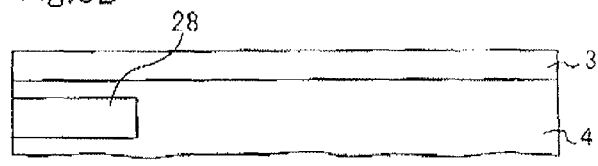
FIG. 8B is a cross sectional view, cut along a direction orthogonal to the air bearing surface, illustrating a process subsequent to FIG. 7B.

Next, as illustrated in FIGS. 7A and 7B, the cladding 4 made of $AlO_x$ and the core 3 made of $TaO_x$ are layered in this order, and a patterning is performed as illustrated in FIGS. 8A and 8B. As one example, a patterning is performed on the core 3 such that an edge surface exposed on the air bearing surface S becomes a rectangle of width 0.6 μm×height 0.4 μm. In the figures, the cladding 4 having formed beforehand and the cladding 4 newly formed in this process are illustrated in an integrated manner.

Figure 9A:
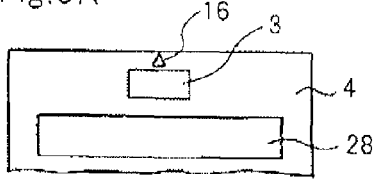
FIG. 9A is a cross sectional view, seen from the air bearing surface side, illustrating a process subsequent to FIG. 8A.
Figure 9B:
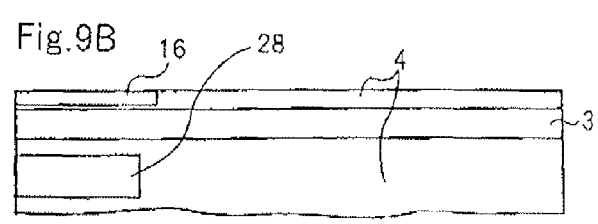
FIG. 9B is a cross sectional view, cut along a direction orthogonal to the air bearing surface, illustrating a process subsequent to FIG. 8B.
Figure 10A:
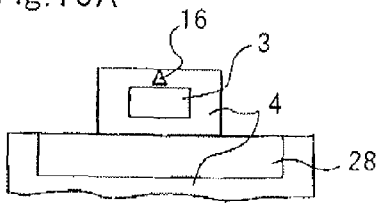
FIG. 10A is a cross sectional view, seen from the air bearing surface side, illustrating a process subsequent to FIG. 9A.
Figure 10B:
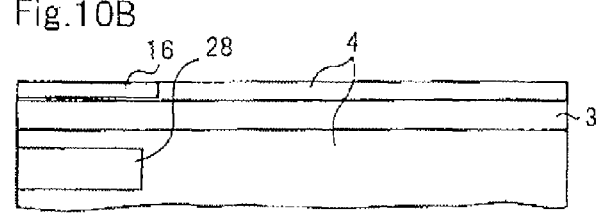
FIG. 10B is a cross sectional view, cut along a direction orthogonal to the air bearing surface, illustrating a process subsequent to FIG. 9B.

As illustrated in FIGS. 9A and 9B, the cladding 4 to be a dielectric body spacer layer is formed above the core 3, and the plasmon generator 16 configured with Ag having a triangular cross sectional shape is formed thereabove. As described above, upon this state where the plasmon generator 16 is formed above the core 3, the cladding 4 is formed so as to surround them, and then is patterned as illustrated in FIGS. 10A and 10B.

Figure 11A:
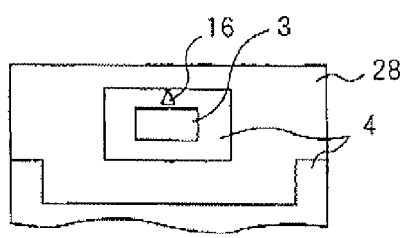
FIG. 11A is a cross sectional view, seen from the air bearing surface side, illustrating a process subsequent to FIG. 10A.
Figure 11B:
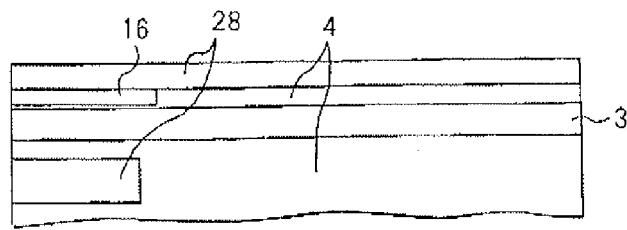
FIG. 11B is a cross sectional view, cut along a direction orthogonal to the air bearing surface, illustrating a process subsequent to FIG. 10B.
Figure 12A:
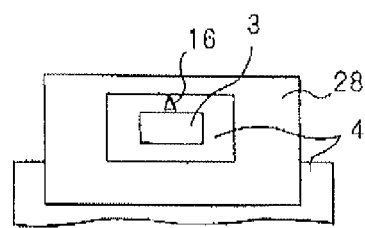
FIG. 12A is a cross sectional view, seen from the air bearing surface side, illustrating a process subsequent to FIG. 11A.
Figure 12B:
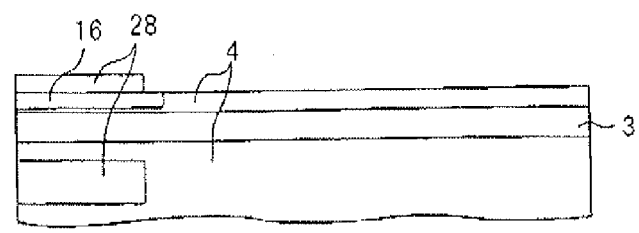
FIG. 12B is a cross sectional view, cut along a direction orthogonal to the air bearing surface, illustrating a process subsequent to FIG. 11B.
Figure 13A:
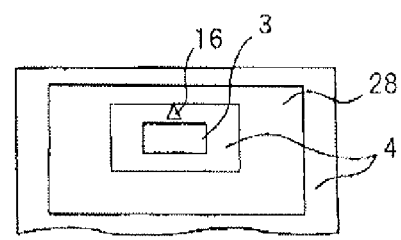
FIG. 13A is a cross sectional view, seen from the air bearing surface side, illustrating a process subsequent to FIG. 12A.
Figure 13B:
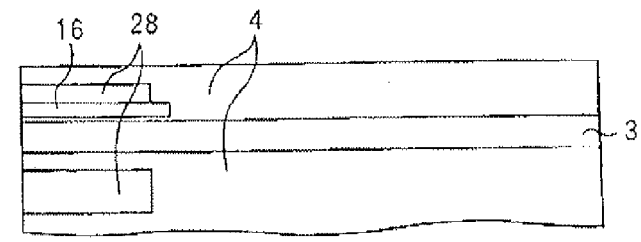
FIG. 13B is a cross sectional view, cut along a direction orthogonal to the air bearing surface, illustrating a process subsequent to FIG. 12B.
Figure 14A:
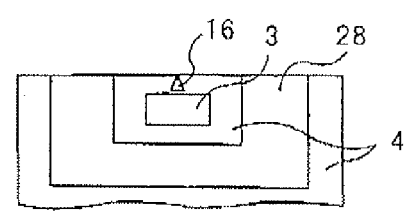
FIG. 14A is a cross sectional view, seen from the air bearing surface side, illustrating a process subsequent to FIG. 13A.
Figure 14B:
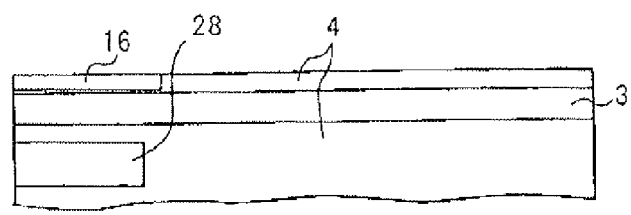
FIG. 14B is a cross sectional view, cut along a direction orthogonal to the air bearing surface, illustrating a process subsequent to FIG. 13B.

Next, as illustrated in FIGS. 11A and 11B, the heat radiation layer 28 is formed so as to surround the cladding 4, and a patterning is performed as illustrated in FIGS. 12A and 12B. In the figures, the heat radiation layer 28 formed beforehand and the heat radiation layer 28 newly formed in this process are illustrated in an integrated manner. Then, as illustrated in FIGS. 13A and 13B, the cladding 4 is formed in a portion where the heat radiation layer 28 does not exist. RIE and polishing (for example, chemical mechanical polishing: CMP) are performed so that upper surfaces of the heat radiation layer 28 and the cladding 4 are flattered as illustrated in FIGS. 14A and 14B.

Figure 15A:
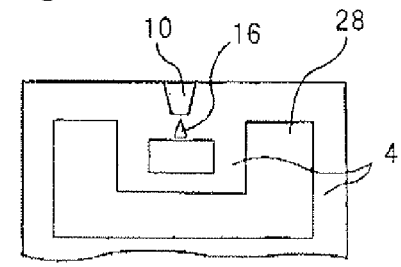
FIG. 15A is a cross sectional view, seen from the air bearing surface side, illustrating a process subsequent to FIG. 14A.
Figure 15B:
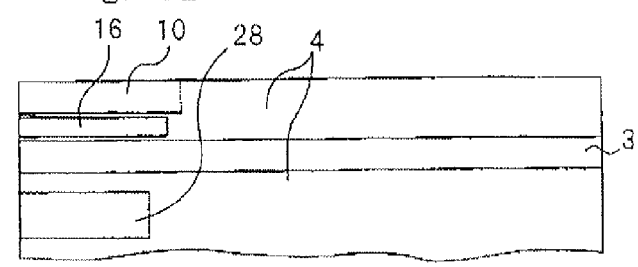
FIG. 15B is a cross sectional view, cut along a direction orthogonal to the air bearing surface, illustrating a process subsequent to FIG. 14B.
Figure 16A:
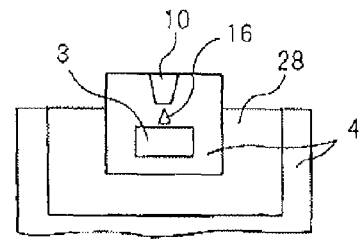
FIG. 16A is a cross sectional view, seen from the air bearing surface side, illustrating a process subsequent to FIG. 15A.
Figure 16B:
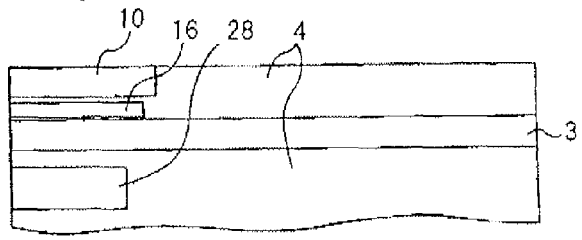
FIG. 16B is a cross sectional view, cut along a direction orthogonal to the air bearing surface, illustrating a process subsequent to FIG. 15B.

As illustrated in FIGS. 15A and 15B, above the flattered upper surfaces of the heat radiation layer 28 and the cladding 4, the cladding 4 is formed, and a pole 10 that is embedded in the cladding 4 is also formed. As illustrated in FIGS. 16A and 16B, a patterning is performed on the cladding 4. As one example, the cladding 4 surrounding the core 3, the plasmon generator 16, and the pole 10 is patterned such that an outer shape of an edge surface exposed on the air bearing surface S becomes a square of width 1.3 μm×height 1.3 μm.

Figure 17A:
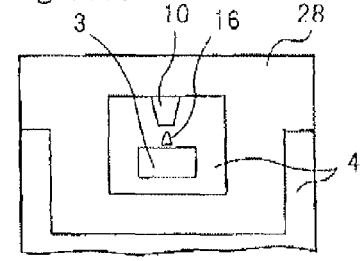
FIG. 17A is a cross sectional view, seen from the air bearing surface side, illustrating a process subsequent to FIG. 16A.
Figure 17B:
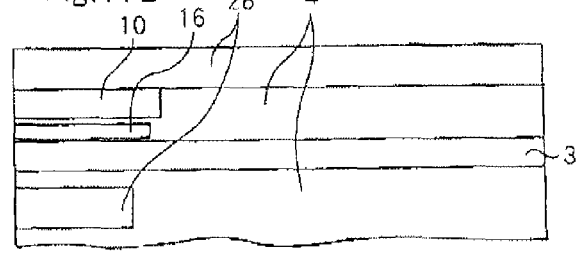
FIG. 17B is a cross sectional view, cut along a direction orthogonal to the air bearing surface, illustrating a process subsequent to FIG. 16B.
Figure 18A:
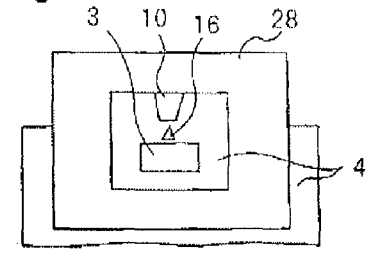
FIG. 18A is a cross sectional view, seen from the air bearing surface side, illustrating a process subsequent to FIG. 17A.
Figure 18B:
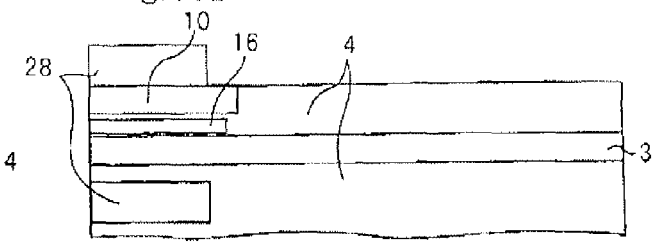
FIG. 18B is a cross sectional view, cut along a direction orthogonal to the air bearing surface, illustrating a process subsequent to FIG. 17B.
Figure 19A:
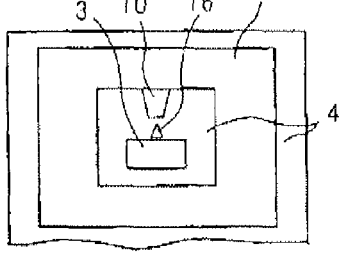
FIG. 19A is a cross sectional view, seen from the air bearing surface side, illustrating a process subsequent to FIG. 18A.
Figure 19B:
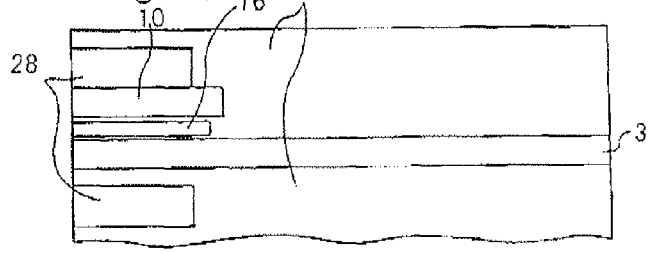
FIG. 19B is a cross sectional view, cut along a direction orthogonal to the air bearing surface, illustrating a process subsequent to FIG. 18B.
Figure 20A:
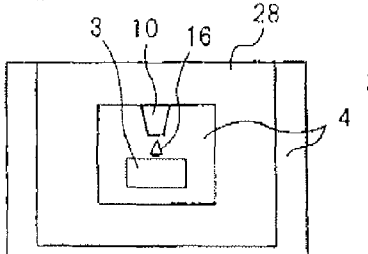
FIG. 20A is a cross sectional view, seen from the air bearing surface side, illustrating a process subsequent to FIG. 19A.
Figure 20B:
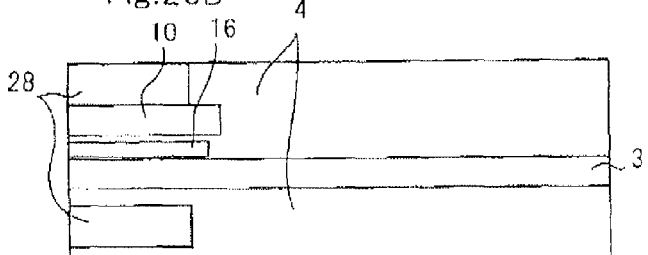
FIG. 20B is a cross sectional view, cut along a direction orthogonal to the air bearing surface, illustrating a process subsequent to FIG. 19B.

Next, a heat radiation layer 28 is formed as illustrated in FIGS. 17A and 17B, and a patterning is performed as illustrated in FIGS. 18A and 18B. Then, a cladding 4 is formed as illustrated in FIGS. 19A and 19B, upper surfaces of the heat radiation layer 28 and the cladding 4 are flattered by RIE and polishing (for example, CMP) as illustrated in FIGS. 20A and 20B. Then, the coil layers 13a and 13b, the overcoat layer 15, etc. illustrated in FIG. 2 are formed.

Not illustrated in the figures, a plurality of thermally-assisted magnetic recording heads is formed on a single wafer by the above-described processes. The wafer is cut into row bars, the air bearing surface S is formed by lapping, and then every piece is cut out as a slider 5. Then, the slider 5 is jointed to a suspension, and a head gimbal assembly is formed. Finally, a light source (a laser diode) 18 having a wavelength of 800 nm and the waveguide 2 are linked.

Next, a preferable size of the thermally-assisted magnetic recording head 1 of the present invention will be discussed. As illustrated in FIG. 1, a cross sectional shape of the core 3 of the waveguide 2 was rectangular with a width in the x-direction 0.6 μm×a height in the z-direction 0.4 μm. An outer cross sectional shape of a portion of the cladding 4 surrounding the core 3 was square with a width in the x-direction 1.3 μm×a height in the z-direction 1.3 μm. A height in the z-direction of an outer shape of the heat radiation layer 28 embedded in the cladding 4 was set as 2.5 μm. Then, a plurality of thermally-assisted magnetic recording heads 1 was formed with each of them having a different width in the x-direction, which was a width A of the outer shape of the heat radiation layer 28 embedded in the cladding 4 in the x-direction from an outermost edge part to the other outermost edge part. In addition, a height of the heat radiation layer 28 in the y-direction was 1 μm.

Figure 21:
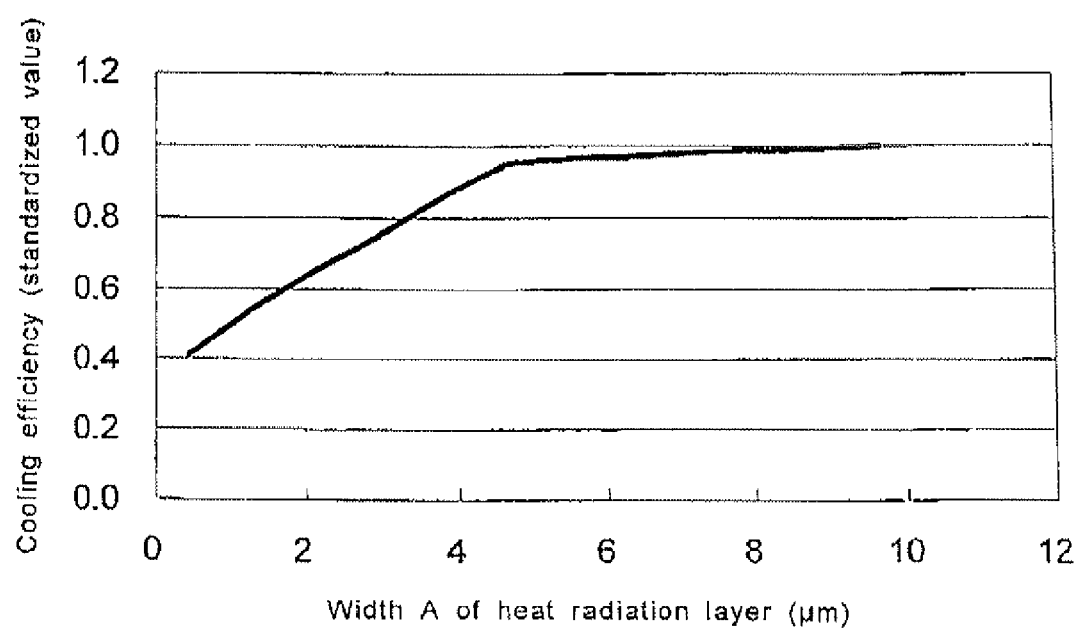
FIG. 21 is a graph illustrating a relationship between a width and a cooling efficiency of the thermally-assisted magnetic recording head, the width being defined as between an outermost edge and the other outermost edge in a cross track direction of a heat radiation layer.

When the thermally-assisted magnetic recording head 1 was activated under the same condition, the temperature increase was more suppressed with a wider width A from the one outermost edge part to the other outermost edge part of the x-direction (the cross track direction) of the heat radiation layer 28. For example, where a laser light 19 having a wavelength of 0.8 μm entered from the light source 18 and where a magnetic information was written from the pole 10 during heating of the magnetic recording medium 14 by the near-field light, and when temperatures of specific portions of the air bearing surface S were measured, the temperatures were lower where the heat radiation layer 28 existed, compared with a case where the heat radiation layer 28 did not exist. And, when a width A in the x-direction of the heat radiation layer 28 was wider, the temperatures of the air bearing surface S were lower. However, when the width A in the x-direction of the heat radiation layer 28 was large to certain degrees, it was confirmed that the temperature of the air bearing surface S no longer decreased. This status is referred to as a cooling efficiency saturation status. FIG. 21 illustrates a relationship between the width A in the x-direction of the outer shape of the heat radiation layer 28 and the corresponding cooling efficiency. Additionally, in the graph of FIG. 21, the cooling efficiency is described based on a standardized value that is defined one upon the cooling efficiency saturation status.

Referring to FIG. 21, it is shown that the cooling efficiency of the thermally-assisted magnetic recording head 1 having the core 3, the cladding 4 and the heat radiation layer 28, which were sized as above-described, was nearly saturated at a point where the width A in the x-direction of the heat radiation layer 28 from the one outermost edge part to the other outermost edge part was approximately 5 μm. When the width A was smaller than the point, the cooling efficiency was lower and the temperature of the air bearing surface S was high. On the other hand, when the width A in the x-direction of the heat radiation layer 28 was more than 5 μm, the cooling efficiency was approximately constant and did not vary, and the temperature of the air bearing surface S was maintained in an approximately constant manner. Therefore, when the width A in the x-direction of the heat radiation layer 28 was 5 μm or more, the temperature increase of the thermally-assisted magnetic recording head 1 itself during the thermally-assisted magnetic recording was suppressed to the extent possible. As a result, heat deformation and an alteration of each part of the thermally-assisted magnetic recording head 1 were suppressed so that high performance and reliability were maintained. Additionally, the width A: 5 μm was approximately four times as large as a width (1.3 μm), which is in the x-direction from one outermost edge part to the other outermost edge part, of the cladding 4 surrounded by the heat radiation layer 28. Therefore, it is preferred that the width A in the x-direction of the heat radiation layer 28 is four times or more of the width of the portion of the cladding 4 in the x-direction surrounded by the heat radiation layer 28 because a sufficient cooling efficiency by the heat radiation layer 28 is obtained.

When a gap between the core 3 and the heat radiation layer 28 is too small, a problem, which is that the generation efficiency of the near-field light is decreased, occurs because the metal configuring the heat radiation layer 28 absorbs the light. On the other hand, when the gap between the core 3 and the heat radiation layer 28 is too large, a problem, which is that the heat radiation efficiency is decreased, occurs. According to results experimentally obtained by the present applicant, when light having a wavelength of 0.8 μm was used and when the gap in the x-direction (the cross track direction) between the core 3 and the heat radiation layer 28, namely a width in the x-direction of a portion of the cladding 4 positioned between the core 3 and the heat radiation layer 28, was 0.3 μm-0.5 μm, a ratio of a propagation light propagating through the core 3 that is absorbed by the metal configuring the heat radiation layer 28 was 20% or less. Therefore, good energy efficiency is obtained and the temperature increase of the thermally-assisted magnetic recording head 1 is maintained at a low level. In the example illustrated in FIG. 1, the gap in the x-direction (the cross track direction) between the core 3 and the heat radiation layer 28, namely the width in the x-direction of the portion of the cladding 4 positioned between the core 3 and the heat radiation layer 28, was set as 0.35 μm.

Next, a height of the heat radiation layer 28 in the y-direction will be discussed. As illustrated above, the heat radiation layer 28 functions to release the heat generated in correspondence to the light propagation for the thermally-assisted magnetic recording to the outside. Accordingly, a certain increase in the temperature of the heat radiation layer 28 is not prevented. The heat radiation layer 28 protrudes from the air bearing surface S when the heat radiation layer 28 is thermally expanded due to this temperature increase. Damage that is caused by contacting the magnetic recording medium 14 must be prevented when the protrusion of the heat radiation layer 28 is excessively large. Therefore, based on thermal expansion coefficients of three materials, Au, Ag, Cu, which have high possibilities to be used as the heat radiation layer 28, and at temperatures of 200° C.-500° C., heights corresponding to protrusion amounts from the air bearing surface S at 2 nm, 5 nm, 8 nm and 10 nm were calculated. Results of the calculations are as follows.

| Au (Thermal expansion coefficient 14.3 [1/° C.]) | | | | |
|---|---|---|---|---|
| | Height of heat radiation layer (μm) | | | |
| Protrusion amount (nm) | 200° C. | 300° C. | 400° C. | 500° C. |
| 2 | 0.70 | 0.47 | 0.35 | 0.28 |
| 5 | 1.75 | 1.17 | 0.87 | 0.70 |
| 8 | 2.80 | 1.86 | 1.40 | 1.12 |
| 10 | 3.50 | 2.33 | 1.75 | 1.40 |

| Ag (Thermal expansion coefficient 18.9 [1/° C.]) | | | | |
|---|---|---|---|---|
| | Height of heat radiation layer (μm) | | | |
| Protrusion amount (nm) | 200° C. | 300° C. | 400° C. | 500° C. |
| 2 | 0.53 | 0.35 | 0.26 | 0.21 |
| 5 | 1.32 | 0.88 | 0.66 | 0.53 |
| 8 | 2.12 | 1.41 | 1.06 | 0.85 |
| 10 | 2.65 | 1.76 | 1.32 | 1.06 |

| Cu (Thermal expansion coefficient 16.8 [1/° C.]) | | | | |
|---|---|---|---|---|
| | Height of heat radiation layer (μm) | | | |
| Protrusion amount (nm) | 200° C. | 300° C. | 400° C. | 500° C. |
| 2 | 0.60 | 0.40 | 0.30 | 0.24 |
| 5 | 1.49 | 0.99 | 0.74 | 0.60 |
| 8 | 2.38 | 1.59 | 1.19 | 0.95 |
| 10 | 2.98 | 1.98 | 1.49 | 1.19 |

A floating height of the regular slider 5 on a surface of the magnetic recording medium 14 is approximately 8 nm. When the temperature of the heat radiation layer 28 is over 400° C., the heat radiation layer 28 itself may possibly be damaged (for example melted). Therefore, a condition set forth in the above-described chart where the protrusion amount is 8 nm or less at 400° C. is a requirement to determine an upper limit of the height of the heat radiation layer 28. Referring to each of the charts, for the heat radiation layer 28 made of Au, a height of 1.40 μm or less is preferable. For the heat radiation layer 28 made of Ag, a height of 1.06 μm or less is preferable. For the heat radiation layer 28 made of Cu, a height of 1.19 μm or less is preferable.

When the height of the heat radiation layer 28 is larger than the height of the plasmon generator 16, a loss ratio of the propagating light 19, which does not contribute to generation of the near-field light, becomes high because the propagating light 19 propagating through the core 3 is absorbed by the heat radiation layer 28. The height of the heat radiation layer 28 is, therefore, preferably smaller than the height of the plasmon generator 16. In general, the height of the plasmon generator 16 is approximately 1 μm-2 μm. From these conditions, it is preferred that the height of the heat radiation layer 28 in the y-direction is 1 μm or less.

Figure 22:
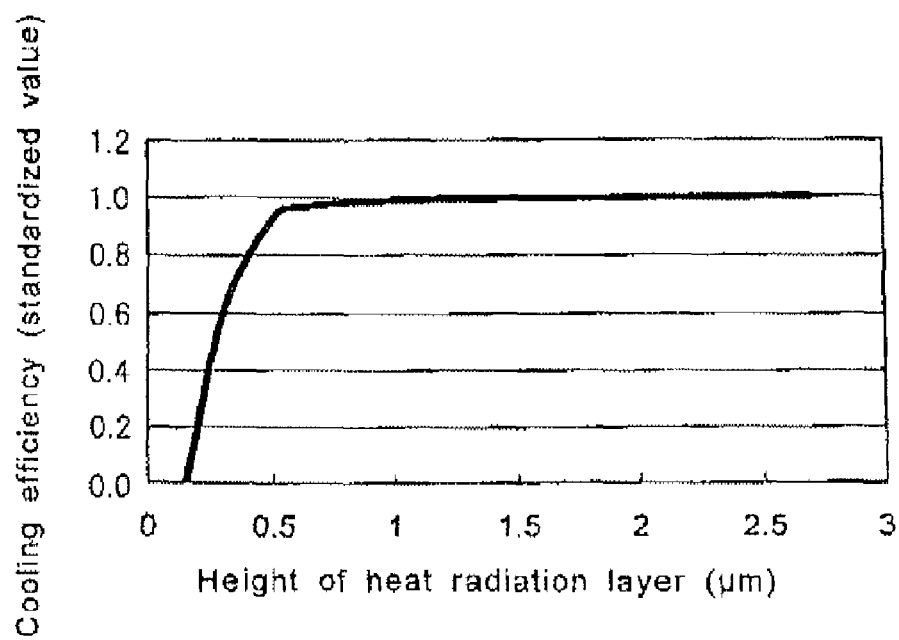
FIG. 22 is a graph illustrating a relationship between a height of the heat radiation layer and the cooling efficiency of the thermally-assisted magnetic recording head.

FIG. 22 illustrates a relationship between the height of the heat radiation layer 28 in the y-direction and the corresponding cooling efficiency under a situation where an element temperature is 300° C. As in the graph of FIG. 21, the cooling efficiency is described based on a standardized value that is defined one upon the cooling efficiency saturation status. Referring to FIG. 22, the cooling efficiency is approximately 0.95 when the height of the heat radiation layer 28 is 0.5 μm. It is assumed that the temperature increase is considerably suppressed. In addition, in the example illustrated in FIG. 22, the cooling efficiency is 1.0 (the cooling efficiency saturation status) when the height of the heat radiation layer 28 is 1 μm.

As a result of the above-described discussion, it is preferred to set the height of the heat radiation layer 28 in the y-direction in a range of 0.5 μm-1 μm to prevent the excessive protrusion of the heat radiation layer 28 and to realize the sufficient cooling efficiency.

Figure 23A:
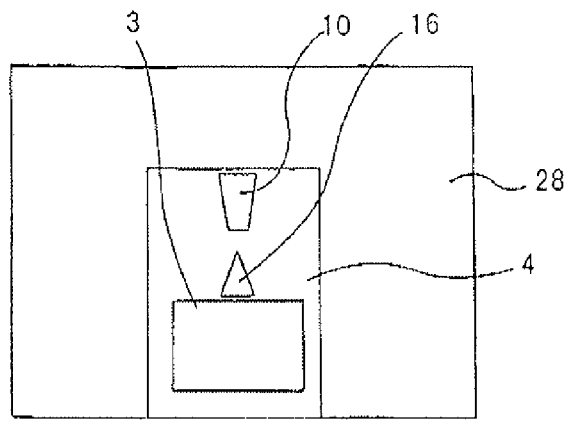
FIGS. 23A-23C are front views of the air bearing surfaces illustrating main parts of modified examples of the thermally-assisted magnetic recording head of the present invention.
Figure 23B:
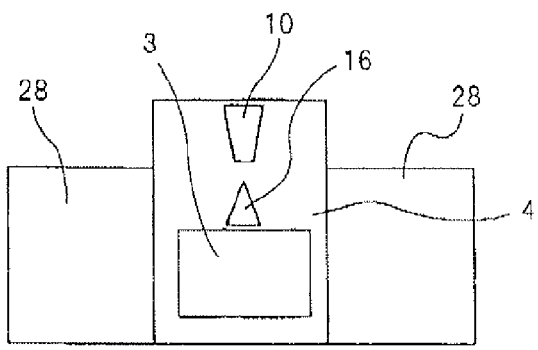
Figure 23C:
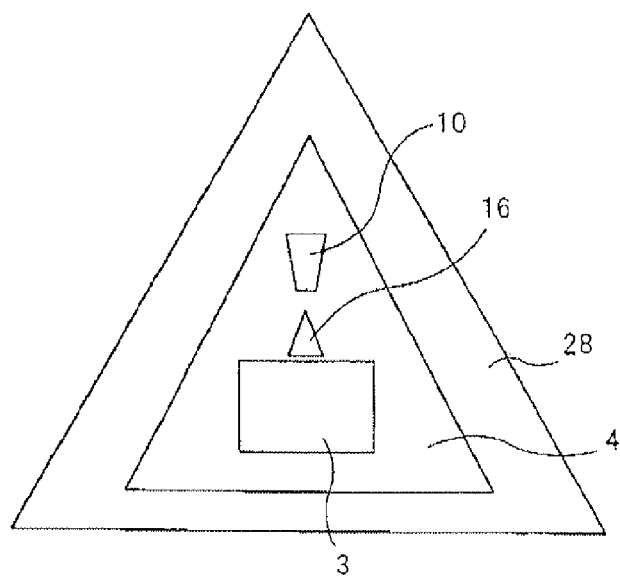

In FIGS. 23A-23C, modified examples of the thermally-assisted magnetic recording head 1 of the present invention are illustrated. As the example illustrated in FIG. 23A, a configuration where the heat radiation layer 28 does not exist under the cladding 4 of the waveguide 2 is applicable for the present invention. As the example illustrated in FIG. 23B, a configuration where the heat radiation layer 28 neither exists above nor below the cladding 4 of the waveguide 2, but exists only at portions of lateral sides of the cladding 4 of the waveguide 2, is applicable. Also, as the example illustrated in FIG. 23C, outer shapes of the cladding 4 of the waveguide 2 and the heat radiation layer 28 can be formed in triangular shapes.

Figure 24A:
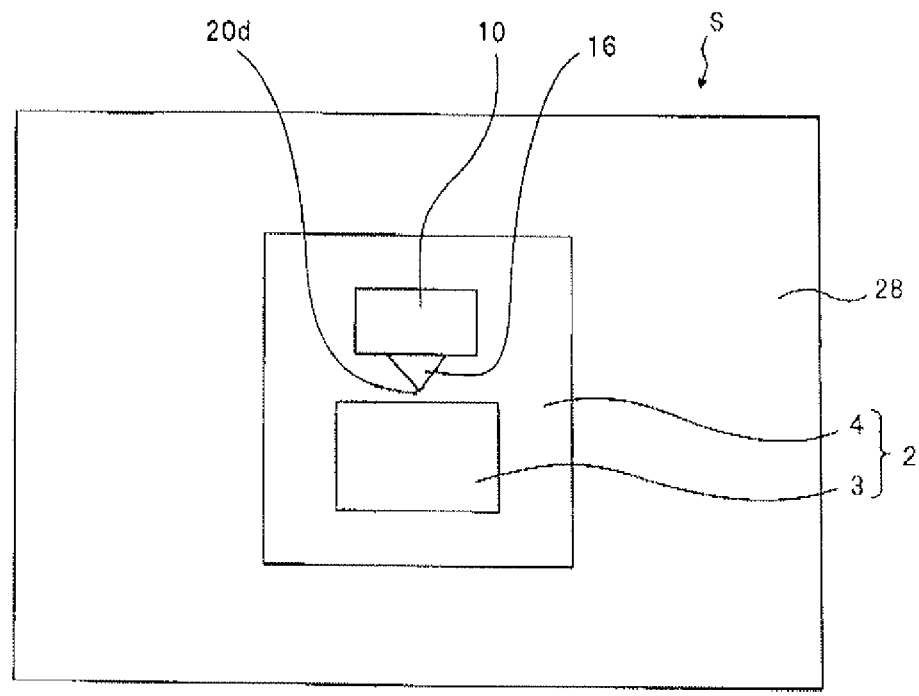
FIGS. 24A and 24B are front views of air bearing surfaces illustrating other modified examples of the thermally-assisted magnetic recording head of the present invention.
Figure 24B:
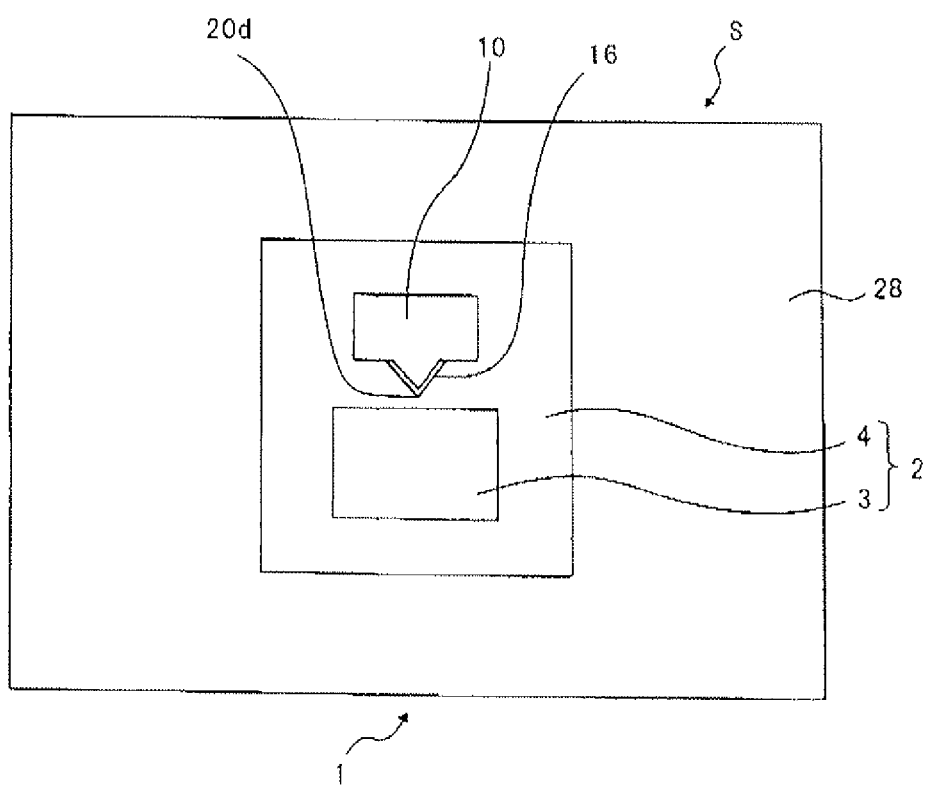

As illustrated in FIG. 24A, the plasmon generator 16 can be formed in an inverted triangular shape by inverting its top and bottom orientation. As illustrated in FIG. 24B, the projection having the inverted triangular shape is formed on the pole 10, and the plasmon generator 16 having a shape along a projection can be formed on a tip of the projection. With this configuration, the plasmon generator 16 and the pole 10 are integrated in a contacting manner. Then, an apex 20d positioned close to and facing the core 3 of the plasmon generator 16 becomes a propagation edge for propagating the surface plasmon 23. Shapes of the heat radiation layers 28 of these configurations can be modified to, for example, configurations illustrated in FIG. 23A-23C.

In FIGS. 25A-27, other embodiments of the thermally-assisted magnetic recording head 1 of the present invention are illustrated. Of this thermally-assisted magnetic recording head 1, the core 3 is not exposed on the air bearing surface S, and the core 3 is in a stepped-backed position in the y-direction (the height direction) from the air bearing surface S. In addition, even with a configuration where the core 3 does not extend to and is not exposed on the air bearing surface S, at least a portion of the cladding 4 of the waveguide 2 extends to the air bearing surface S and is exposed.

Figure 25A:
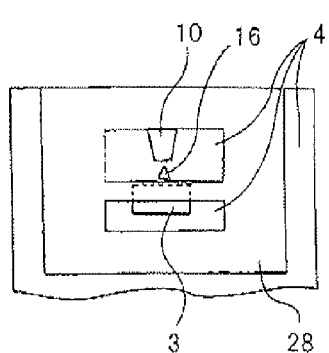
FIG. 25A is a front view of the air bearing surface.
Figure 25B:
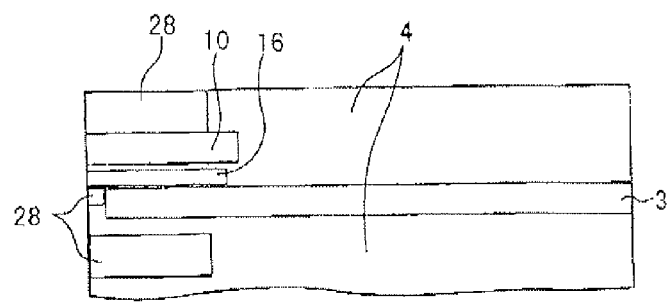
FIG. 25B is a cross sectional view, cut along the direction orthogonal to the air bearing surface, illustrating the other embodiments of the thermally-assisted magnetic recording head of the present invention.

In the configurations illustrated in FIGS. 25A and 25B, a band of the heat radiation layer 28 is disposed under the plasmon generator 16 on the air bearing surface S. Therefore, a portion of the core 3 under the plasmon generator 16 is covered by the heat radiation layer 28.

Figure 26A:
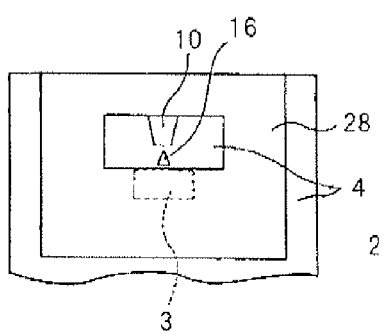
FIG. 26A is a front view of the air bearing surface.
Figure 26B:
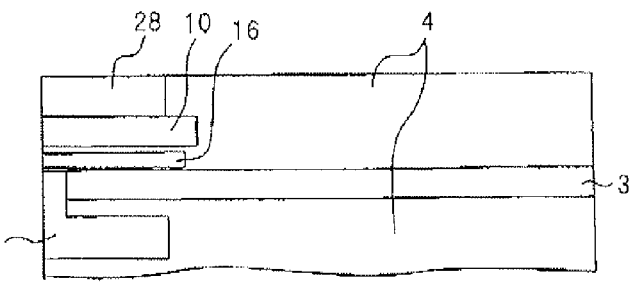
FIG. 26B is a cross sectional view, cut along the direction orthogonal to the air bearing surface, illustrating the other modified examples of the other embodiment of the thermally-assisted magnetic recording head of the present invention.

In the configurations illustrated in FIGS. 26A and 26B, the heat radiation layer 28 is disposed entirely under the plasmon generator 16 on the air bearing surface S. Therefore, an edge part of the core 3 and an edge part of the cladding 4 positioned under the plasmon generator 16 are covered entirely by the heat radiation layer 28.

The configurations illustrated in FIGS. 25A-27 have an advantage in that the temperature increase is suppressed. In other words, light that propagates and that is tapered in the core 3, but that is not coupled with the near-field generator 16a, diffuses while traveling to the air bearing surface S from the tip of the core 3. Since the light diffuses in such a way and energy is dispersed, a large amount of heat is prevented from being generated in a particular portion of the air bearing surface S, resulting in suppression of an increase in the temperature.

Figure 27:
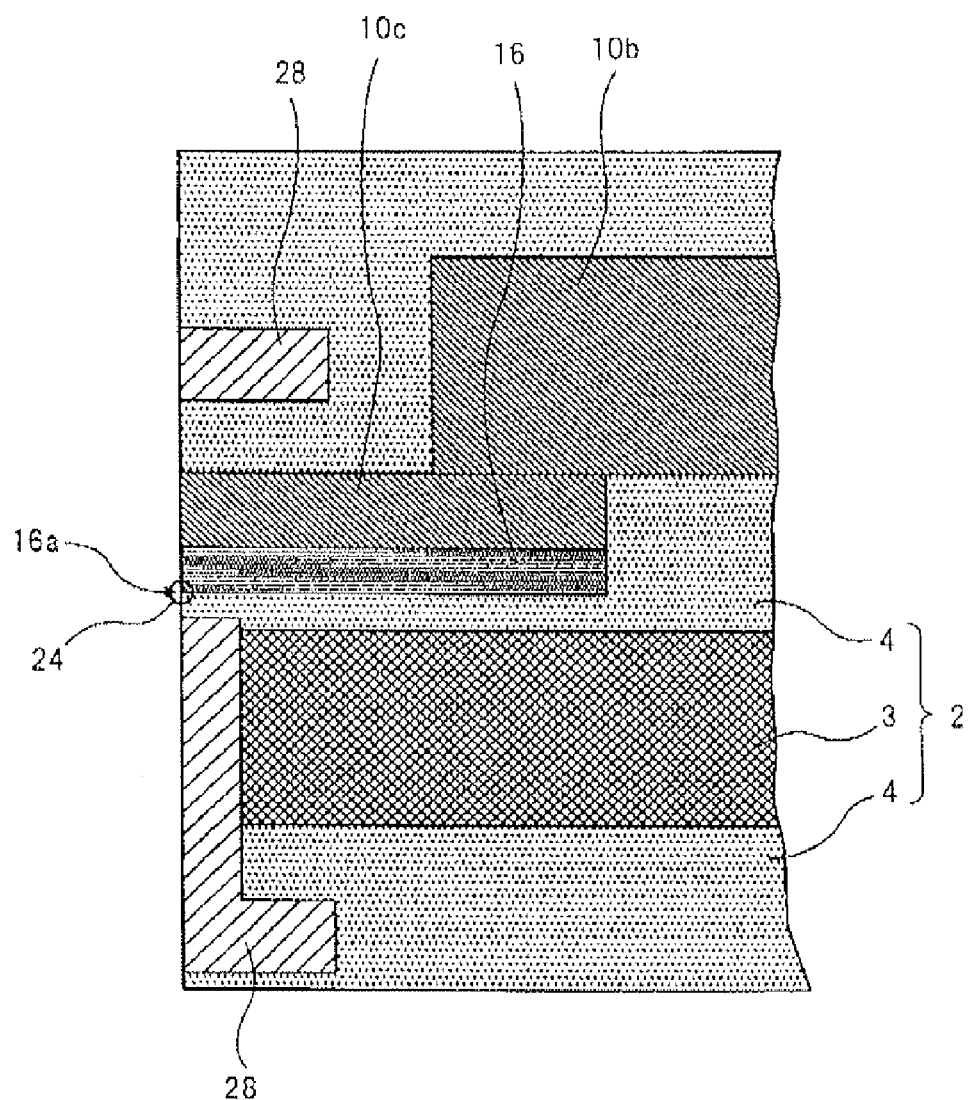
FIG. 27 is an enlarged cross sectional view, cut along the direction orthogonal to the air bearing surface, illustrating a modified example of the other embodiment of the thermally-assisted magnetic recording head of the present invention.

With a configuration in which the core 3 is disposed in a stepped-back position from the air bearing surface S in the y-direction (the height direction), in which the plasmon generator 16 has the inverted triangular shape as in FIGS. 24A and 24B, and in which the apex 20d positioned close to and facing the core 3 is the propagation edge, a narrowed near-field light 24 is realized by applying the following configuration. That is, as illustrated in FIG. 27, the near-field light 24 is generated in a position that is the tip of the plasmon generator 16 and that does not contact the heat radiation layer 28 made of a metal, etc. Therefore, in the configuration where the core 3 is disposed in the stepped-back position from the air bearing surface S in the y-direction (the height direction) and where the heat radiation layer 28 is accordingly positioned closer to the plasmon generator 16 on the air bearing surface S, the near-field generator 16a is small and the near-field light 24 is narrowed. In order to obtain the effect of the narrowed near-field light 24, it is not required that an entire part of the edge surface of the core 3 is covered by the heat radiation layer 28 on the air bearing surface S. The core 3 can be exposed on the air bearing surface S in a position away from the tip of the plasmon generator 16.

In each of the above-described embodiments, in order to realize high density recording, a minute area of the magnetic recording medium 14 is heated using the near-field light 24, and the plasmon generator 16 is disposed close to the waveguide 2. On the other hand, the configuration of the present invention where the heat radiation layer 28 is embedded in the cladding 4 surrounding the core 3 of the waveguide 2 on the air bearing surface S is also applicable with the configuration without the plasmon generator 16, which is, in other words, a configuration using a plasmon antenna, or a configuration where the propagating light 19 is directly irradiated from the core 3 of the waveguide 2 to the magnetic recording medium 14.

While preferred embodiments of the present invention have been shown and described in detail, such description is for illustrative purposes only, and it is to be understood that changes and variations may be made without departing from the spirit or scope of the following claims.

What is claimed is:

1. A thermally-assisted magnetic recording head that includes an air bearing surface facing a recording medium and that performs a magnetic recording while heating the recording medium, comprising:
   a waveguide configured with a core through which light propagates and a cladding that surrounds a periphery of the core and that includes at least a portion extending to the air bearing surface; and
   a heat radiation layer that is embedded in the cladding that surrounds the periphery of the core on the air bearing surface, and that is made of a material having a higher thermal conductivity coefficient than the cladding.

2. The thermally-assisted magnetic recording head according to claim 1, further comprising:
   a near-field generator that is surrounded by the cladding and that is positioned facing the core.

3. The thermally-assisted magnetic recording head according to claim 2, further comprising:
   a pole that has an edge part that is positioned on the air bearing surface; and
   a plasmon generator that faces a portion of the core and that extends to the air bearing surface, wherein
   both the pole and the plasmon generator are surrounded by the cladding on the air bearing surface,
   the plasmon generator has a propagation edge extending in a longitudinal direction, the propagation edge includes an overlapping part overlapped with the core in the longitudinal direction and the near-field generator, the near-field generator is positioned in the vicinity of the edge part of the pole on the air bearing surface, the overlapping part of the propagation edge couples with laser light propagating through the core in a surface plasmon mode, and generates a surface plasmon, the surface plasmon generated in the overlapping part propagates through the propagation edge to the near-field generator.

4. The thermally-assisted magnetic recording head according to claim 3, wherein a height of the heat radiation member, which extends from the air bearing surface in a direction orthogonal to the air bearing surface, is smaller than a height of the plasmon generator, which extends from the air bearing surface in the direction orthogonal to the air bearing surface.

5. The thermally-assisted magnetic recording head according to claim 1, wherein on the air bearing surface, a width of the heat radiation layer embedded in the cladding, which is between one outermost edge part and another outermost edge part in a cross track direction, is four times larger than a width of a portion of the cladding, which is sandwiched by the heat radiation member and is between the one outermost edge part and the another outermost edge part in the cross track direction.

6. The thermally-assisted magnetic recording head according to claim 1, wherein the material of the heat radiation layer is either a metal selected from Au, Ag, Pt, Fe, and Cu, or an alloy including at least one of Au, Ag, Pt, Fe, and Cu.

7. The thermally-assisted magnetic recording head according to claim 1, wherein a height of the heat radiation layer in a direction orthogonal to the air bearing surface is configured such that a maximum heat expansion amount of the material of the heat radiation layer in the direction orthogonal to the air bearing surface is smaller than a floating height from the air bearing surface on the recording medium under an operating condition.

* * * * *